(12) United States Patent
D'Allest et al.

(10) Patent No.: US 8,617,353 B2
(45) Date of Patent: Dec. 31, 2013

(54) DEINKING PROCESS

(75) Inventors: Jean-Francois D'Allest, Mullhouse (FR); Tiina Sarja, Oulu (FI); Scott Rosencrance, Douglasville, GA (US)

(73) Assignee: Kemira Oyj, Helsinki (FI)

( * ) Notice: Subject to any disclaimer, the term of this patent is extended or adjusted under 35 U.S.C. 154(b) by 0 days.

(21) Appl. No.: 13/375,647

(22) PCT Filed: Jun. 17, 2009

(86) PCT No.: PCT/US2009/047619
§ 371 (c)(1),
(2), (4) Date: Jan. 10, 2012

(87) PCT Pub. No.: WO2010/147581
PCT Pub. Date: Dec. 23, 2010

(65) Prior Publication Data
US 2012/0103543 A1    May 3, 2012

(51) Int. Cl.
*D21C 5/02*      (2006.01)
(52) U.S. Cl.
USPC .................. 162/5; 162/4; 516/111; 516/117; 423/335
(58) Field of Classification Search
USPC .................. 516/111–112, 116–119, 132–134
See application file for complete search history.

(56) References Cited

U.S. PATENT DOCUMENTS

| | | | |
|---|---|---|---|
| 4,231,841 A | 11/1980 | Calmanti et al. | |
| 5,069,816 A * | 12/1991 | DeSantis et al. | 516/111 |
| 5,843,336 A * | 12/1998 | Steelman | 516/117 |
| 6,179,957 B1 | 1/2001 | Irinatsu et al. | |
| 6,210,526 B1 * | 4/2001 | Pohlen | 162/4 |
| 6,420,456 B1 * | 7/2002 | Koski | 523/213 |
| 2004/0069188 A1 * | 4/2004 | Lin et al. | 106/486 |
| 2004/0186337 A1 * | 9/2004 | Rohde et al. | 585/739 |
| 2007/0158039 A1 | 7/2007 | Rosencrance et al. | |
| 2007/0284067 A1 * | 12/2007 | Basilio et al. | 162/4 |

FOREIGN PATENT DOCUMENTS

| | | |
|---|---|---|
| EP | 0067333 A | 12/1982 |
| EP | 0989229 B1 | 9/1998 |
| WO | 91/05905 A | 5/1991 |
| WO | 02/12618 A | 2/2002 |
| WO | 03085191 A | 10/2003 |
| WO | 2006/089395 A | 8/2006 |
| WO | 2007081921 A2 | 7/2007 |

OTHER PUBLICATIONS

International Search Report and Written Opinion dated Dec. 10, 2009

* cited by examiner

*Primary Examiner* — Richard Crispino
*Assistant Examiner* — Eric Yaary
(74) *Attorney, Agent, or Firm* — Thomas Horstemeyer, LLP

(57) ABSTRACT

The present invention provides a process for deinking printed waste paper comprising the steps of: a) converting the printed waste paper to an aqueous pulp slurry in a pulper, where ink is detached from paper pulp; b) subjecting the pulp slurry to flotation in order to remove hydrophobic contaminants including ink from the pulp slurry, said flotation being carried out in the presence of a deinking chemical additive comprising modified silica obtained by treating hydrophilic silica particles with a hydrophobic organic liquid or modified metal silicate obtained by treating hydrophilic metal silicate particles with a hydrophobic organic liquid or a mixture of such modified silica and modified metal silicate. The present invention increases the yield of the flotation step without affecting the brightness of the flotation accept.

16 Claims, No Drawings

DEINKING PROCESS

CROSS REFERENCE TO RELATED APPLICATION

This application is the 35 U.S.C. §371 national stage of PCT Application entitled "Deinking Process," having serial number PCT/US2009/047619, filed on 17 Jun. 2009, which is incorporated by reference in its entirety.

FIELD OF THE INVENTION

The present invention relates to a process for deinking printed waste paper. More particularly, the present invention relates to the use of specific deinking chemical additives to increase the yield of the flotation step in the deinking process with no detrimental effect on the quality of deinked pulp.

BACKGROUND OF THE INVENTION

The paper industry has been practicing waste paper recycling to regenerate usable cellulosic fiber for paper making for many decades. In these processes, ink is removed from the waste paper pulp using a suitable deinking chemical composition. By controlling the deinking process, a recycling mill can affect the properties of the paper such as the brightness and can improve the usability of the cellulosic fiber for paper manufacturing.

Deinking consists of a series of complex chemical and physical processes. These events include but are not limited to ink detachment, ink dispersion, ink collection, ink transport, and removal of inks from the waste paper pulp slurry. Each of these microprocesses have different surface and interfacial demands within the recycling operation in order to efficiently and effectively deink waste paper and produce quality paper.

Conventionally, two different methods have been employed to remove the ink and ink related entities like specks (agglomerates of ink particles) in order to produce the deinked fiber after repulping. These two processes are flotation and wash deinking. Often, processes contain both flotation and wash deinking and can be referred to as combination deinking processes. The underlying chemical and physical requirements to successfully deink are different for flotation, wash, and combination deinking processes, and are also strongly dependant of the waste paper composition.

More specifically, flotation/washing combination deinking refers to a deinking process wherein the ink, detached from the paper pulp by the deinking chemical composition and the action of mechanical energy in the pulping step, is separated from the cellulosic fibers primarily through the flotation devices or flotation cells of the recycling process prior to passing the pulp through washing devices in the washing stage.

Flotation processes are fundamentally different than washing processes. This difference is partly because the ink particle size and hydrophobicity are important for favorable separation. Flotation methods of ink removal generally involve passing air bubbles through an aqueous system containing dispersed cellulose fiber and mineral filler that are most often produced via a repulping process. The resulting repulped slurry of cellulose fiber and mineral filler having therein additives added either before, during, or after repulping. As the air bubbles rise within the slurry and carry the ink particles with them through specific attractive interaction, they generate foam which is enriched in ink that is subsequently removed from the top of the flotation cell. The amount of foam that is typically favored in flotation deinking systems is an amount which can be collected by skimming, aspiration, or other means, and which transports with it an enriched concentration of ink while minimizing the amount of other solids like fibers and fillers that are rejected.

Typically, either a flotation-derived or flotation/washing-derived deinking chemistry is utilized in a given deinking system. At some point in either process, the deinked, repulped waste paper is often passed through a series of fine cleaners and/or screens where the small particulate contaminants (e.g., sand and grit) are removed. Additional processing stages may be required such as, for example, dispersion, to reduce the particle size of any contaminants, or a special cleaning stage with special cleaners designed to remove specific contaminants.

The deinked waste paper is then held in storage until it is eventually fed to a papermaking machine.

The chemistry used in traditional deinking involves most often addition of fatty acid soaps that are efficient ink collectors for ink flotation in alkaline systems (pH greater than 9), although these soaps can demonstrate decreased ink detachment characteristics and lead to deposit concerns later in the process.

Surfactant-based deinking aids, especially specific nonionic surfactants, can be excellent for ink detachment and ink dispersion and transport. Some nonionic surfactants assist in ink collection. If not properly chosen, however, these additives can also actually hinder ink collection in flotation processes. Flotation deinking usually utilizes different surfactants than washing because the resulting surface properties and size of the ink particles that is beneficial for flotation deinking is different than is desirable for wash deinking. Examples of traditional nonionic surfactants that may be used in the flotation deinking process include alkylene oxide adducts of fatty alcohols or fatty acid, and alkanolamides. Usually, nonionic surfactants are used in association with soap, either separately or in combined blend of nonalkoxylated fatty acid soap and nonionic surfactant.

The chemistry involved also in traditional deinking very often involves addition of caustic soda in the pulper to increase the pH, often greater than 9 and sometimes greater than 10. Increasing the pH, however, often causes yellowing and darkening of the waste paper stock—especially when the waste paper contains groundwood or mechanical pulps. To counteract this undesirable darkening effect, a bleaching additive is typically added to increase the whiteness and brightness of the pulp. Sodium silicate, or waterglass, is also of common use in alkaline condition to protect bleaching additives from chemical decomposition by metallic ions, and to help in ink collection.

In addition to final deinked pulp quality, productivity of the deinking process is a key factor of cost-effective deinked pulp production. Total yield of deinking processes range typically from 90% down to 60%. In these 10% to 40% losses, the hydrophobic contaminant including ink is only about a few percent, typically less than 4%. So the main losses in deinking of recovered printed paper are fibers and mineral fillers, and these losses are inherent in any flotation or flotation/washing deinking processes.

In flotation deinking processes, the flotation step is the main source of losses. High Brightness gain at the flotation step with respect to high flotation yield is the key characteristic of a cost-effective flotation deinking process.

WO 2007/081921 discloses a method of deinking printed waste paper, comprising the steps of converting the waste paper to an aqueous pulp slurry in a pulper, contacting the aqueous pulp slurry with inorganic particles and with a deinking composition comprising a non-ionic surfactant or a fatty acid, and recovering deinked paper pulp from the aqueous pulp slurry. The inorganic particles may be hydrophobically-modified inorganic particles, and are preferably calcium carbonate.

EP 0 989 229 B1 discloses a process for eliminating and inhibiting adhesive impurities, i.e. so called stickies, from paper pulp during the process of treating waste paper. During the treatment of the waste paper a hydrophobized synthetic or natural mineral (such as zeolite or calcium carbonate) is added to the paper pulp prior to or during supplying the paper pulp into the flotation installation. The mineral is so strongly hydrophobized that it is not dispersible in water.

US 2007/0284067 discloses a composition for deinking waste paper, comprising a surfactant and a mineral-based deinking component. The mineral-based deinking component is hydrophobic and has been prepared by treating the mineral particles with hydrophobizing reagents. An exemplified hydrophobized mineral is kaolin hydrophobized with alkyl hydroxamate and tall oil, the latter being activated by calcium chloride. Also other minerals are mentioned such as talc, quartz, mica, potash, kyanite etc.

U.S. Pat. No. 4,443,357 discloses hydrophobic silica or silicate which is the reaction product of hydrophilic silica or silicate and a hydrophobic higher-aliphatic alcohol, the reaction being carried out in a non-aqueous liquid carrier at a temperature of above 100° C. A preferred alcohol is a straight-chain primary alkanol having from 8 to 30 carbon atoms. According to this patent it is believed that the silanol groups on the surface of the silica or silicate react with the hydrophobic alcohol to form a stable chemical bond. The hydrophobic silica or silicate is used in liquid defoamer formulations, through dispersion in a liquid hydrocarbon carrier. Such compositions are used for reducing foam in black liquor.

In the description of the prior art in U.S. Pat. No. 4,443,357 it is set forth that for well over three decades, tiny particles of silica or relatively high-silica silicates have been used as dispersed additives in organic liquid carrier to make defoaming liquid composition for foam inhibition in aqueous foaming systems. Typically, these silicas or silicates have been treated to make them hydrophobic, perhaps the most common treating agent being silicone (organically substituted polysiloxane) oil. Furthermore, it is stated that the combination of silicone oil/hydrophilic silica at normally used ratios is ineffective as an antifoam unless it is heat treated at 150° C. for ca. 2 h. Under these conditions the silicon oil presumably reacts with the silica surface. In the description of the prior art in U.S. Pat. No. 4,443,357, it is stated also that the higher the degree of hydrophobicity of the modified silica particle, the higher its dispersability in the oily carrier and the higher its contribution to the efficiency of the defoaming liquid composition.

JP 2007-253014 discloses a powder defoaming agent comprising hydrophobic silica dispersed In a hydrocarbon oil and a porous powder which is hydrophilic silica, aluminium oxide, titanium oxide, calcium carbonate, magnesium carbonate, carbon black or talc. The defoaming agent is prepared by adsorbing the dispersion of hydrophobic silica in the hydrocarbon oil on the porous powder. The final powder defoaming agent is suitable for building materials, especially mortar and for plasters.

WO 91/05905 discloses aqueous dispersions of alkaline earth soaps and/or alkaline earth resin soaps for de-inking printed waste paper, which dispersions as a component may contain an alkali or alkaline earth metal aluminium silicate. The deinking composition Is In the form of an aqueous dispersion. According to the patentees, the dispersion gave equivalent deinking results compared to a commercially available dispersion containing calcium soap, and the main advantage of the dispersion was that the froth stability was considerably lower which eliminates the need of using foam inhibitors (page 3, line 25 - page 4, line 4, and page 22 last paragraph).

U.S. Pat. No. 4,231,841 discloses a process for the de-Inking of printed waste paper by using a de-Inking composition comprising five components which are:
(F) an alkali metal salt of a fatty acid,
(G) a non-ionic surfactant,
(H) an anionic surfactant,
(I) sodium- carboxylmethyl-cellulose, and
(J) an alkaline inorganic salt selected from the class consisting of metasilicate, disilicate, carbonate, borate and polyphosphate, especially sodium metasilicate. An object of the deinking composition was to produce a pulp having a high brightness and with a high yield during the recovery step.

WO 02/12618 discloses a flotation deinking process comprising adding to an aqueous waste paper pulp slurry (1) a polyester, (2) a first deinking agent which Is an alkoxylated hydrophobic base and (3) a second deinking agent which is an alkoxyiated hydrophobic base having a lower cloud point than the first deinking agent (claim 1). D4 also mentions that typical chemicals used in the pulper Include NaOH and hydrogen peroxide and that sodium silicate, a metal chelating agent and calcium chloride may also be added to the pulper and/or flotation to maintain water hardness to ensure calcium soap formation.

In flotation or flotation/washing deinking process of printed waste paper, there is a need for a more efficient and cost effective chemical solution to reduce the loss of fibers and fillers in the flotation step while keeping an effective ink collection and so a deinked pulp production of high quality, i.e. having both high brightness and low residual concentration of ink and ink related entitles like specks.

SUMMARY OF THE INVENTION

The present Invention relates to a process for deinking printed waste paper comprising repuiping the waste paper to obtain a pulp slurry and subjecting the pulp slurry to flotation in the presence of a deinking chemical additive comprising silica particles and/or metal silicate particles having a hydrophobic organic liquid adsorbed thereon. By the present invention the flotation yield is strongly Increased by reducing fiber and ash/filler rejects with no negative effect on the removal of hydrophobic contaminants, especially Ink particles and ink related entitles like specks. At the same time the brightness of the flotation accept is unchanged or even Improved. Due to the increased deinked pulp production and the decreased flotation rejects, there will be savings in the total costs in the production of deinked pulp.

DETAILED DESCRIPTION OF THE INVENTION

In one aspect of the present Invention there is provided a process for deinking printed waste paper comprising the steps of:
a) converting the printed waste paper to an aqueous pulp slurry In a puiper, where Ink Is detached from paper pulp,
b) subjecting the pulp slurry to flotation In order to remove hydrophobic contaminants Including Ink from the pulp slurry, said flotation being carried out in the presence of a deinking chemical additive comprising modified silica obtained by treating hydrophilic silica particles with a hydrophobic organic liquid.

In a second aspect of the present invention there is provided a process for deinking printed waste paper comprising the steps of:
a) converting the printed waste paper to an aqueous pulp slurry in a pulper, where ink is detached from paper pulp,
b) subjecting the pulp slurry to flotation in order to remove hydrophobic contaminants including ink from the pulp slurry, said flotation being carried out in the presence of a deinking chemical additive comprising modified metal silicate obtained by treating hydrophilic metal silicate particles with a hydrophobic organic liquid. The deinking chemical additive may also comprise a mixture of said modified silica and said modified metal silicate.

According to the present invention is was surprisingly found that the introduction of the specific silica-based and/or metal silicate-based deinking chemical additive, have exceptional positive effect on the selective flotation of ink and ink related entities like specks resulting in a strong increase of the flotation yield along with an unchanged or increased brightness, and having no negative impact on ink detachment efficiency and yellowing of the deinked pulp.

Contrary to prior known hydrophobic silica which is typically produced by reacting silica with a reactive hydrophobizing agent or with another hydrophobizing agent under conditions that promote the reaction such as high temperatures of at least 100° C., the modified silica of the present invention is produced by treating hydrophilic silica with the hydrophobic organic liquid at such conditions that there is no substantial chemical reaction between the hydrophilic silica and the hydrophobic organic liquid. The same applies to the modified metal silicate and the mixture of modified silica and modified metal silicate of the present invention. The modified silica and/or modified metal silicate are enough hydrophilic to be dispersible in water and also in the aqueous pulp slurry, and at the same time enough hydrophobic to provide the desired property of controlling foam formation in the flotation cell.

In one embodiment of the present invention, the deinking chemical additive is introduced at the beginning of the pulping stage, preferably in solid form, and more preferably as a powder. In another embodiment of the present invention the deinking chemical additive is first dispersed in water and then the dispersion is introduced at the beginning of the pulping stage. In yet another embodiment of the present invention the deinking chemical additive is added to the pulp stream entering the flotation step or directly into the flotation as a powder, or in the form of an aqueous dispersion.

In one embodiment of the present invention, the hydrophobic organic liquid is adsorbed on the hydrophilic silica particles and/or hydrophilic metal silicate particles by spraying. According to the present invention it is also possible to adsorb the hydrophobic organic liquid on the hydrophilic silica particles and/or hydrophilic metal silicate particles by other means, such as by mixing.

The hydrophilic silica starting material useful in this invention has a porous and/or agglomerated particulate structure. The preferred hydrophilic silica starting material is precipitated silica, a relatively pure form of silica containing more than 95% by weight $SiO_2$. Also other forms of hydrophilic silica can be used such as diatomaceous silica, or fumed silica which normally is made by hydrolyzing silicon tetrahalide vapour in a flame of hydrogen and oxygen, producing smoke which comprises nanometric silica particles which are capable of agglomeration.

The hydrophilic metal silicate starting material useful in this invention has a porous and/or agglomerated particulate structure.

The hydrophilic metal silicate starting material may be an alkaline earth metal silicate, such as calcium silicate or magnesium silicate, aluminosilicate or zinc silicate or a mixture of two or more of such metal silicates. A preferred hydrophilic metal silicate starting material is aluminosilicate, especially precipitated aluminosilicate, which is synthesized through the reaction of sodium silicate with aluminium sulphate.

In one embodiment of the present invention, the hydrophilic silica particles and/or hydrophilic metal silicate particles have an average particle diameter of from 0.5 µm to 500 µm, preferably from 5 µm to 100 µm.

According to the present invention the deinking chemical additive may comprise modified silica particles or modified metal silicate particles or a mixture thereof in any proportion from 100:0 to 0:100.

In one embodiment of the present invention, up to 30% weight by weight of hydrophilic silica particles or hydrophilic metal silicate particles are replaced by other hydrophilic mineral particles, such as talc, titanium dioxide, clay, calcium carbonate or magnesium carbonate. The amount to be replaced is preferably from 5% to 20% by weight.

In one embodiment of the present invention, the hydrophobic organic liquid comprises an organic substance or a mixture of organic substances. The organic substance or mixture of organic substances is selected in such a way that it is hydrophobic enough to provide, to the deinking chemical additive, the desired property of controlling foam formation in the flotation cell, and it is, however, not too hydrophobic in order to not impair the deinking chemical additive capability of dispersing in the aqueous pulp slurry.

Preferred organic substances comprise hydrocarbon oils, ester oils, oxygenated hydrocarbon oils, polyethyleneoxide-polypropyleneoxide copolymers, alkoxylated hydrocarbons, polypropylene glycols, fatty alcohols, fatty acids, silicone oils, silicone derivatives and antioxidants and mixtures thereof.

The hydrocarbon oil may be mineral oil, paraffinic oil, animal or vegetable oil or synthetic oil.

The ester oil may be the product of reaction of fatty alcohol with fatty acid, like a mono or diester of polyethyleneglycol or polypropyleneglycol.

The oxygenated hydrocarbon oil may be aliphatic alcohols or aliphatic ethers.

The alkoxylated hydrocarbon may be alkoxylated fatty alcohol or alkoxylated fatty acid.

Silicone derivatives may be silicone polyether.

In one embodiment of the present invention, the hydrophobic organic liquid is first emulsified with water, and then the hydrophilic silica particles and/or hydrophilic metal silicate particles are treated with the "oil in water" or "water in oil" emulsion. Preferably said emulsion is mixed and adsorbed on the hydrophilic silica particles and/or hydrophilic metal silicate particles.

In one embodiment of the present invention, the treatment of the hydrophilic silica particles and/or hydrophilic metal silicate particles with the hydrophobic organic liquid is carried out at a temperature from 5° C. to 90° C., preferably from 15° C. to 50° C. In case of elevated temperatures the hydrophobic organic liquid may be pre-heated to the desired temperature before the treatment with the hydrophilic silica powder and/or hydrophilic metal silicate powder.

In one embodiment of the present invention, the weight ratio of the hydrophobic organic liquid to the hydrophilic silica and/or hydrophilic metal silicate is from 10:90 to 70:30, preferably from 30:70 to 60:40.

In one embodiment of the present invention, the deinking chemical additive is introduced in an amount of from 0.1 kg/ton to 20 kg/ton, preferably from 0.5 kg/ton to 10 kg/ton based on the weight of the printed waste paper.

The deinking chemical additive of the present invention is water dispersible.

In one embodiment of the present invention one or more surfactants are added to the aqueous pulp slurry. Such surfactants are well-known in the art and are typically non-ionic surfactants, soaps or fatty acids or combinations thereof. However, the present invention also works without surfactants.

As compared to hydrophobic silica described in the prior art wherein a stable chemical bond is formed between the silanol groups on the surface of the silica and the hydrophobizing reagent, the deinking chemical additive according to the present invention is produced under gentle conditions, such as by spraying at ambient temperature, which does not result in the formation of any chemical bond.

The present invention more specifically comprises a process for deinking printed waste paper that comprises ink and paper pulp, comprising the steps of converting the printed waste paper to an aqueous pulp slurry in a pulper where ink is detached from paper pulp; subjecting the pulp slurry to flotation in order to remove hydrophobic contaminants including ink from the pulp slurry, said flotation being carried out in the presence of the deinking chemical additive comprising modified silica obtained by adsorption of the hydrophobic organic liquid on hydrophilic silica particles, or modified metal silicate obtained by adsorption of the hydrophobic organic liquid on hydrophilic metal silicate particles, or a mixture of such modified silica and modified metal silicate; and recovering deinked paper pulp from the aqueous pulp slurry.

Printed waste paper comprises newsprint, magazines, mixed office waste, books, telephone directories, printed advertising materials, laser printed materials and computer paper, etc. These different sorts of printed waste paper can be mixed in any proportion with respect to this invention. The paper fibers used to produce these materials may be chemically pulped materials, such as Kraft pulp, or may be chemically treated high-yield pulps, such as chemithermomechanical pulp, or may be mechanically produced pulps, such as groundwood pulp or mixtures thereof.

Typically the printed waste paper comprises at least two of following: Old Newspapers (ONP), Old Magazines (OMG) and Mixed Office Waste (MOW). Preferable the ONP is present in an amount of at most 95% by weight, more preferably at most 80% by weight.

The deinking process of the present invention includes first the step of converting the printed waste paper to an aqueous pulp slurry in a vessel that is commonly known in the art as a "pulper". Pulping is normally conducted under a specific set of conditions including temperature, pH, and water hardness. This converting step preferably occurs at a temperature ranging from about 25° C. to about 70° C. In one preferred embodiment of the invention, the converting step occurs at a temperature ranging from about 35° C. to about 55° C. In another preferred embodiment of the invention, the aqueous pulp slurry comprises from about 5% to about 35% printed waste paper pulp by weight. More preferably, the aqueous pulp slurry comprises from about 10% to about 25% printed waste paper pulp by weight. This is often referred to as "pulping consistency"—which is a term used in the paper industry to describe the concentration (w/w) of an aqueous slurry of pulp fibers and fillers. The aqueous slurry may further comprise soap, fatty acid, nonionic surfactant, caustic or soda ash, sodium silicate, hydrogen peroxide, a chelant, a biocide or mixtures thereof. Preferably, concentrations of sodium hydroxide or soda ash range from about 0 kg/ton of printed waste paper to about 20 kg/ton of printed waste paper being deinked. The concentration of soap, fatty acid or nonionic surfactant or a combination thereof ranges from about 0 kg/ton of printed waste paper to about 10 kg/ton of printed waste paper being deinked. The concentration of soap, fatty acid or nonionic surfactant or a combination thereof can also range from about 0.2 kg/ton of printed waste paper to about 10 kg/ton of printed waste paper being deinked. In another preferred embodiment of the invention, concentrations of a chelant range from about 0 kg/ton of printed waste paper to about 3 kg/ton of printed waste paper being deinked. In yet another preferred embodiment of the invention, concentrations of a peroxide range from about 0 kg/ton of printed waste paper to about 20 kg/ton of printed waste paper being deinked. In still another preferred embodiment of the invention, concentrations of a silicate, such as sodium silicate, range from about 0 kg/ton of printed waste paper to about 20 kg/ton of printed waste paper being deinked.

After the pulping step, the pulped aqueous slurry may be subjected to cleaning, and screening, followed by flotation where ink and other contaminants are separated from the cellulosic fiber stream. After flotation the deinked pulp may also be subsequently washed, thickened and bleached to the target brightness prior to being sent to the paper machine where supplements—such as retention aids, strength aids, drainage aids, and/or paper sizing agents—may be added. In general, paper is produced that meets certain specifications—including brightness, dirt count, strength, size (water repellency), and/or water absorbency levels.

Deinking is preferably carried out at a pH of from about 6.8 to about 11, more preferably from about 7.5 to about 10.5.

The present invention will now be described in further detail by the following non-limiting examples, which illustrate some embodiments of the invention. In this specification the percentages are % by weight unless otherwise specified.

In the following examples the deinking chemical additive of the present invention is also referred to as Foam Control Additive (FCA).

EXAMPLES

In the following examples, Old Newspapers (ONP), Old Magazines (OMG) and Mixed Office Waste (MOW) were received from different geographic locations and mills.

In each example, the specific variable parameters of the experimental deinking procedure common to every trial are presented in a summary table. These summary tables include:
- the ratio of the different sort of waste paper,
- the dosage of the different deinking chemicals in the pulper: specific surfactant for deinking, sodium hydroxide, sodium silicate (marked as silicate in the tables of the experiments), hydrogen peroxide (the amounts in the tables refer to the amount of the chemical product as such; e.g. "NaOH (50%): 15 kg/t" means 15 kg of a 50% NaOH solution per ton, or 7.5 kg of NaOH 100% per ton),
- the consistency, pH and temperature of the pulp at the pulping stage,
- the flotation time and temperature.

The pulping is accomplished in 2 steps.

A first short pre-pulping of 3 minutes is made in a Lamort helicoldal pulper (Lam'Deinkit) by introducing 1500 grams of the dry waste papers and the amount of tap water required for the desired consistency, in order to get a homogeneous sample of pre-pulped waste paper. Within each given example, the properties of the Foam Control Additives (FCA) are compared with the reference (no FCA) on the same pre-pulp sample.

Then sample (200 grams dry) of this pre-pulp is added to a thermostated Kitchen-Aid along with the various deinking chemicals, including systematically 1 gram of $CaCl_2.2H_2O$ for adjustment of water hardness to typical mill condition. When FCA is employed, it is added also in the pulper along with the other chemicals. Then the pulping is continued with all chemicals for 15 minutes at setting rotation speed 2 and at the desired pulping temperature.

Batch flotation is then performed in a 16 liters Lamort flotation cell on 160 grams of dry pulp at 1% consistency. Before running the flotation, 15 grams of $CaCl_2.2H_2O$ is added to the flotation cell for adjustment of water hardness to usual mill condition.

Flotation yield is calculated from mass balance of flotation feed and flotation rejects with the following formula:

Flotation Yield (%)=(1−[total dry flotation rejects (gram)/total dry flotation feed (gram)])×100

Pads (8 grams each) are prepared in duplicate for Brightness measurements of the flotation accept. Brightness value is the average of 8 measurements on the 2 pads (2 measures per face), and is achieved with the Technidyne ColourTouch PC Spectrophotometer, with standard illuminant D65 (average day light), standard observer 10°, and without UV.

The specific surfactant for deinking is either:
- soap (obtained by saponification of tallow fatty acid): Soap A, Soap B,
- or non-ionic surfactant (alkoxylated fatty alcohol): Surfactant A, Surfactant B,
- or blend of fatty acid and non-ionic surfactant: Blend A, Blend B.

These different surfactant technologies can also be combined.

Example 1

Preparation of Foam Control Additives (FCA)

The various Foam Control Additives (FCA) are prepared in a blender, by adsorption of hydrophobic liquid organic substance or mixtures of different substances on the silica particles through spray application, at room temperature. The main components of the FCA composition used in the different examples are noted in Table 1. All FCA are water dispersible but are used in a dry form (as powder).

TABLE 1

| FCA reference | SILICA (precipitated) | ORGANIC SUBSTANCE | ORGANIC/ SILICA (weight/weight) |
|---|---|---|---|
| FCA 1 | Silica A | Mineral oil (40%) Polyethyleneglycol ester (33%) Polypropylene glycol (PPG) (27%) | 1.32 |
| FCA 2 | Silica A | Polyethyleneoxide-Polypropyleneoxide copolymer | 1.03 |
| FCA 3 | Silica B | Polyethyleneoxide-Polypropyleneoxide copolymer | 1.02 |
| FCA 4 | Silica A | PPG | 1 |
| FCA 5 | Silica C | PPG | 1 |
| FCA 6 | Silica A | Polyethyleneoxide-Polypropyleneoxide copolymer, silicone polyether | 1 |
| FCA 7 | Silica A | Alkoxylated fatty alcohol | 1 |
| FCA 8 | Silica A | PEG and PPG ester, silicone polyether | 1 |

In the next examples 2 and 3, these Foam Control Additives are compared to well known, commercial, non water dispersible, hydrophobized minerals, which are not part of this invention. Hydrophobization of these commercial minerals is achieved by chemical reaction of specific organic species with the chemical groups at the surface of the mineral. These products are:

Product A: hydrophobized talc,

Product B: hydrophobized precipitated calcium carbonate,

Product C: hydrophobized silica,

Product D: hydrophobized silica.

In the next example 4, Foam Control Additives are compared with 2 other experimental hydrophobized, non water dispersible, mineral prepared by simple adsorption of polydimethysiloxane (DMPS) of various molecular weight and viscosity on hydrophilic silica powder:

ND powder A: DMPS 100 cps adsorbed on Silica A (organic/silica w/w=1)

ND powder B: DMPS 100 cps+DMPS 30000 cps (20%) adsorbed on Silica A (organic/silica w/w=1)

These 2 products are also not part of this invention.

In the next example 5, a Foam Control Additive is compared to 2 different formulations of liquid, oil based defoamer, prepared by dispersing different type of hydrophobic silica powder in various oil phase. These 2 products are commercial oil based defoamer for pulp application, and are also not part of this invention.

These 2 products are:

Liquid defoamer A: dispersion of hydrophobic silica in mineral oil

Liquid defoamer B: dispersion of a different hydrophobic silica in mineral oil blended with ester.

Example 2

| Pulper | Flotation | | |
|---|---|---|---|
| ONP/OMG: 20/80 Soap A: 2.5 kg/t Surfactant B: 0.2 kg/t NaOH (50%): 15 kg/t Silicate (40%): 10 kg/t $H_2O_2$ (30%): 10 kg/t Consistency: 18% pH: 10.3 Temperature: 47° C. | Time: 3 min 00 Temperature: 50° C. | | |
| Additional Additives in pulper | Dosage (kg/t) | Flotation yield (%) | Brightness Flotation accept (%) |
| No additional additive (ref) | 0 | 64.9 | 54.8 |
| FCA 1 | 10 | 76.5 | 54.6 |
| Product A | 10 | 63.8 | 54.8 |
| Product B | 10 | 65.2 | 55.4 |

The ONP/OMG ratio is 20/80. Deinking is achieved in alkaline condition.

The FCA 1 product at this high addition rate shows a huge increase of the flotation yield with no negative effect on the Brightness of the flotation accept.

The 2 hydrophobized non water dispersible minerals have no positive influence on the flotation yield. Product B shows however a slight positive effect on the Brightness of the flotation accept.

Example 3

| Pulper | Flotation |
|---|---|
| ONP/OMG: 20/80 Soap A: 3 kg/t NaOH (50%): 15 kg/t Silicate (40%): 10 kg/t $H_2O_2$ (30%): 10 kg/t Consistency: 18% pH: 9.7 Temperature: 47° C. | Time: 2 min 30 Temperature: 50° C. |

| Additional Additives in pulper | Dosage (kg/t) | Flotation yield (%) | Brightness Flotation accept (%) |
|---|---|---|---|
| No additional additive (ref) | 0 | 76.0 | 57.9 |
| FCA 1 | 2 | 78.5 | 58.0 |
| FCA 3 | 2 | 79.5 | 58.0 |
| Product C | 2 | 76.4 | 58.2 |
| Product D | 2 | 76.4 | 58.3 |

The ONP/OMG ratio is 20/80. Deinking is achieved in alkaline condition.

At a 5 time lower addition rate, FCA technology still demonstrates a notable increase of the flotation yield without altering Brightness of the flotation accept.

By comparison, the 2 commercial, non water dispersible, hydrophobized silica has no very significant influence on the flotation yield and on Brightness of flotation accept.

Example 4

| Pulper | Flotation |
|---|---|
| ONP/OMG: 20/80 Soap A: 3 kg/t NaOH (50%): 13.5 kg/t Silicate (40%): 10 kg/t $H_2O_2$ (30%): 10 kg/t Consistency: 20% pH: 10.1 Temperature: 47° C. | Time: 2 min 30 Temperature: 50° C. |

| Additional Additives in pulper | Dosage (kg/t) | Flotation yield (%) | Brightness Flotation accept (%) |
|---|---|---|---|
| No additional additive (ref) | 0 | 68.9 | 56.8 |
| FCA 2 | 2 | 73.4 | 56.5 |
| FCA 6 | 2 | 73.7 | 56.7 |
| FCA 7 | 2 | 75.5 | 56.6 |
| ND powder A | 2 | 70.1 | 56.6 |
| ND powder B | 2 | 69.1 | 56.8 |

The ONP/OMG ratio is 20/80. Deinking is achieved in alkaline condition.

FCA technology shows an important increase of the flotation yield without significant decrease in Brightness of the flotation accept.

By comparison, the 2 non water dispersible, hydrophobized silica made by adsorption of DMPS on hydrophilic silica, have very limited influence on the flotation yield and on Brightness of flotation accept.

Example 5

| Pulper | Flotation |
|---|---|
| ONP/OMG: 20/80 Soap A: 3 kg/t NaOH (50%): 12.5 kg/t Silicate (40%): 10 kg/t $H_2O_2$ (30%): 10 kg/t Consistency: 20% pH: 9.9 Temperature: 47° C. | Time: 2 min 30 Temperature: 50° C. |

| Additional Additives in pulper | Dosage (kg/t) | Flotation yield (%) | Brightness Flotation accept (%) |
|---|---|---|---|
| No additional additive (ref) | 0 | 72.5 | 53.8 |
| FCA 2 | 2 | 77.0 | 54.0 |
| Liquid Defoamer A | 1 | 72.8 | 54.0 |
| Liquid Defoamer B | 1 | 71.9 | 54.4 |

The ONP/OMG ratio is 20/80. Deinking is achieved in alkaline condition.

FCA 2 achieves an important increase of the flotation yield with no loss of Brightness of the flotation accept.

By comparison, the 2 oil based defoamer, added in the pulping stage at the same dosage of active as with FCA product, have no significant influence both on the flotation yield and on ink flotation selectivity.

Example 6

| Pulper | Flotation |
|---|---|
| ONP/OMG: 20/80 Soap A : 3 kg/t NaOH (50%): 13 kg/t Silicate (40%): 10 kg/t $H_2O_2$ (30%): 10 kg/t Consistency: 20% pH: 10.1 Temperature: 47° C. | Time: 2 min 30 Temperature: 50° C. |

| FCA in pulper | Dosage (kg/t) | Flotation yield (%) | Brightness Flotation accept (%) |
|---|---|---|---|
| No FCA (ref) | 0 | 63.0 | 56.2 |
| FCA 1 | 2 | 65.8 | 56.5 |
| FCA 8 | 2 | 66.6 | 56.1 |

The ONP/OMG ratio is 20/80. Deinking is achieved in alkaline condition.

FCA 1 and 8 achieve both a significant increase of the flotation yield with no change of Brightness of the flotation accept.

Example 7

| Pulper | Flotation |
|---|---|
| ONP/OMG: 50/50 Soap A: 3 kg/t NaOH (50%): 14 kg/t Silicate (40%): 10 kg/t $H_2O_2$ (30%): 10 kg/t Consistency: 16.5% pH: 9.6 Temperature: 47° C. | Temperature: 50° C. |

-continued

| FCA in pulper | Flotation time | Dosage (kg/t) | Flotation yield (%) | Brightness Flotation accept (%) |
|---|---|---|---|---|
| No FCA (ref) | 2 min 30 | 0 | 68.0 | 47.8 |
| FCA 1 | 2 min 30 | 2 | 71.2 | 47.8 |
| FCA 3 | 2 min 30 | 2 | 73.7 | 47.7 |
| No FCA (ref) | 1 min 30 | 0 | 76.1 | 45.9 |
| FCA 2 | 1 min 30 | 2 | 79.3 | 45.9 |

The ONP/OMG ratio is increased to 50/50 compared to previous examples. Pulping consistency is adjusted to this new waste paper composition. Deinking is achieved in alkaline condition. Deinking results at different flotation time are presented in the table.

The positive effect of the FCA technology on flotation yield, with no change of Brightness of the flotation accept, is observed with this different furnish composition at the 2 different flotation time.

Example 8

| Pulper | Flotation |
|---|---|
| ONP/OMG: 80/20 | |
| Soap A: 3 kg/t | |
| NaOH (50%): 17 kg/t | |
| Silicate (40%): 10 kg/t | |
| $H_2O_2$ (30%): 10 kg/t | |
| Consistency: 15% | |
| pH: 9.6 | Time: 2 min 30 |
| Temperature: 47° C. | Temperature: 50° C. |

| FCA in pulper | Dosage (kg/t) | Flotation yield (%) | Brightness Flotation accept (%) |
|---|---|---|---|
| No FCA (ref) | 0 | 73.3 | 45.4 |
| FCA 2 | 2 | 77.6 | 45.3 |

The ONP/OMG ratio is increased again, up to 80/20. Pulping consistency is adjusted to this new waste paper composition. Deinking is achieved in alkaline condition.

FCA 2 shows a very notable increase of the flotation yield, with no detrimental effect to the Brightness of the flotation accept.

Example 9

| Pulper | Flotation |
|---|---|
| ONP/OMG: 95/5 | |
| Soap A: 3 kg/t | |
| NaOH (50%): 19 kg/t | |
| Silicate (40%): 10 kg/t | |
| $H_2O_2$ (30%): 10 kg/t | |
| Consistency: 14% | |
| pH: 10.2 | Time: 2 min 30 |
| Temperature: 47° C. | Temperature: 50° C. |

| FCA in pulper | Dosage (kg/t) | Flotation yield (%) | Brightness Flotation accept (%) |
|---|---|---|---|
| No FCA (ref) | 0 | 80.9 | 45.0 |
| FCA 3 | 2 | 89.2 | 44.9 |

The ONP/OMG ratio is increased again up to 95/5. Pulping consistency is adjusted to this new waste paper composition. Deinking is achieved in alkaline condition.

By comparison with deinking trial in ONP/higher OMP content condition (Examples 2 and 3); this example demonstrates a synergistic effect between the FCA 3 and the low magazine content in the waste paper: huge increase of the flotation yield, with no negative influence on the Brightness of the flotation accept.

Example 10

| Pulper | Flotation |
|---|---|
| ONP/OMG: 0/100 | |
| Blend A: 1 kg/t | |
| NaOH (50%): 0 kg/t | |
| Silicate (40%): 0 kg/t | |
| $H_2O_2$ (30%): 0 kg/t | |
| Consistency: 20% | |
| pH: 7.8 | Time: 2 min 30 |
| Temperature: 35° C. | Temperature: 35° C. |

| FCA in pulper | Dosage (kg/t) | Flotation yield (%) | Brightness Flotation accept (%) |
|---|---|---|---|
| No FCA (ref) | 0 | 79.8 | 64.4 |
| FCA 1 | 2 | 82.6 | 64.3 |
| FCA 4 | 2 | 82.5 | 64.4 |
| FCA 5 | 2 | 81.4 | 64.4 |

This deinking trial is achieved with 100% OMG. Pulping consistency is adjusted to this new waste paper composition. Deinking is achieved at rather low temperature and in neutral condition (no addition of any alkali and hydrogen peroxide in the pulper). Soap is also replaced by a blend of fatty acid and non-ionic surfactant.

The FCA technology provides an increase of the flotation yield with no alteration of the Brightness of the flotation accept.

Example 11

| Pulper | Flotation |
|---|---|
| MOW/OMG: 90/10 | |
| Blend B : 1 kg/t | |
| NaOH (50%): 0 kg/t | |
| Silicate (40%): 0 kg/t | |
| $H_2O_2$ (30%): 0 kg/t | |
| Consistency: 20% | |
| pH: 7.9 | Time: 3 min 30 |
| Temperature: 50° C. | Temperature: 50° C. |

| FCA in pulper | Dosage (kg/t) | Flotation yield (%) | Brightness Flotation accept (%) |
|---|---|---|---|
| No FCA (ref) | 0 | 80.8 | 78.3 |
| FCA 1 | 2 | 83.7 | 78.4 |
| FCA 2 | 2 | 85.0 | 78.5 |

ONP is replaced by MOW and OMG content is reduced to 10%. Pulping consistency is adjusted to this new waste paper composition. Deinking is achieved in neutral condition. The deinking surfactant is a blend of fatty acid and non-ionic surfactant.

The FCA technology demonstrates a very significant increase of the flotation yield; with no negative effect on the Brightness of the flotation accept.

Example 12

| Pulper | | Flotation | |
|---|---|---|---|
| MOW/OMG: 67/33 | | | |
| Soap B: 1.3 kg/t | | | |
| Surfactant A: 1 kg/t | | | |
| NaOH (50%): 0 kg/t | | | |
| Silicate (40%): 0 kg/t | | | |
| $H_2O_2$ (30%): 0 kg/t | | | |
| Consistency: 20% | | | |
| pH: 7.9 | | Time: 3 min 30 | |
| Temperature: 56° C. | | Temperature: 56° C. | |
| FCA in pulper | Dosage (kg/t) | Flotation yield (%) | Brightness Flotation accept (%) |
| No FCA (ref) | 0 | 79.2 | 73.3 |
| FCA 2 | 2 | 84.0 | 73.5 |
| FCA 3 | 4 | 85.8 | 73.0 |

The MOW/OMG ratio is increased to 67/33. Deinking is achieved also with an association of soap and non-ionic surfactant, at higher temperature, and in neutral condition.

As in the former example, FCA technology performs very well, with a strong increase of the flotation yield along with about unchanged Brightness of the flotation accept.

It is understood that upon reading the above description of the present invention, one skilled in the art could make changes and variations therefrom. These changes and variations are included in the spirit and scope of the following appended non-limiting claims.

The invention claimed is:

1. A process for deinking printed waste paper comprising the steps of:
    a) converting the printed waste paper to an aqueous pulp slurry in a pulper, where ink is detached from paper pulp,
    b) subjecting the pulp slurry to flotation in order to remove hydrophobic contaminants including ink from the pulp slurry, said flotation being carried out in the presence of a deinking chemical additive comprising modified silica obtained by spraying and adsorbing a hydrophobic organic liquid on hydrophilic silica particles at a temperature of at most 90° C., wherein the modified silica of the deinking chemical additive is not exposed to temperatures above about 90° C. prior to use in the deinking process.

2. The process of claim 1 wherein the deinking chemical additive is introduced at the beginning of the pulping stage.

3. The process of claim 1 wherein the deinking chemical additive is introduced at the beginning of the pulping stage in solid form.

4. The process of claim 3 wherein the deinking chemical additive is introduced as a powder.

5. The process of claim 1 wherein the temperature is at most 50° C.

6. The process of claim 1 wherein the hydrophilic silica comprises precipitated porous hydrophilic silica powder.

7. The process of claim 1 wherein the hydrophilic silica particles have an average particle diameter of from 0.5 µm to 500 µm.

8. The process of claim 1 wherein the hydrophilic silica particles have an average particle diameter of from 5 µm to 100 µm.

9. The process of claim 1 wherein the deinking chemical additive is dispersible in water and in the aqueous pulp slurry.

10. The process of claim 1 wherein the deinking chemical additive increases the flotation yield by reducing fiber and filler rejects.

11. The process of claim 1 wherein the hydrophobic organic liquid is selected from the group consisting of hydrocarbon oils, ester oils, oxygenated hydrocarbon oils, polyethyleneoxide-polypropyleneoxide copolymers, alkoxylated hydrocarbons, polypropylene glycols, fatty alcohols, fatty acids, silicone oils, silicone derivatives, antioxidants, and mixtures thereof.

12. The process of claim 1 wherein the weight ratio of the hydrophobic organic liquid to the hydrophilic silica is within the range from 10:90 to 70:30.

13. The process of claim 1 wherein the deinking chemical additive is introduced in an amount of from 0.1 kg/ton to 20 kg/ton based on the weight of the printed waste paper.

14. The process of claim 1 wherein the deinking chemical additive is introduced in an amount of from 0.5 kg/ton to 10 kg/ton based on the weight of the printed waste paper.

15. The process of claim 1 wherein the deinking chemical additive is first dispersed in water and then the dispersion is introduced at the beginning of the pulping stage.

16. The process of claim 1 wherein the deinking chemical additive is added to the pulp stream entering the flotation step as a powder or in the form of an aqueous dispersion.

* * * * *